June 4, 1968 H. V. KING 3,386,338
SELF-LOCKING ACTUATORS FOR ROTARY VALVE AND
OTHER TWO-POSITION ROTARY ELEMENTS
Filed Jan. 9, 1964 2 Sheets-Sheet 1

INVENTOR
HENRY V. KING

BY William E.P. Bayly

ATTORNEY

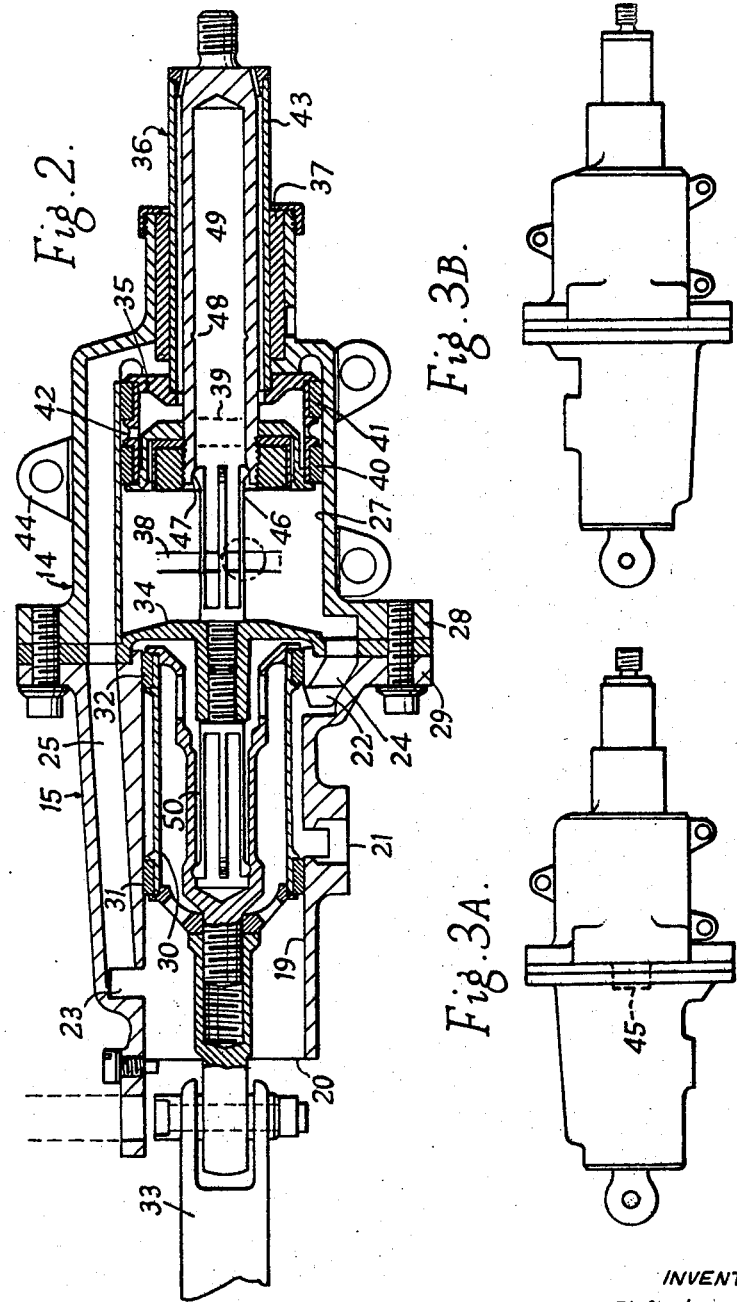

United States Patent Office 3,386,338
Patented June 4, 1968

3,386,338
SELF-LOCKING ACTUATORS FOR ROTARY VALVE AND OTHER TWO-POSITION ROTARY ELEMENTS
Henry V. King, Fareham, England, assignor to Plessey-U.K. Limited, a British company
Filed Jan. 9, 1964, Ser. No. 336,702
Claims priority, application Great Britain, Jan. 18, 1963, 2,284/63
6 Claims. (Cl. 91—44)

This invention relates to actuators for rotary valves and other two-position rotary elements and has for an object to provide an improved fluid-pressure-operated actuator which ensures at the end of each reversing stroke automatic locking of the rotary element so as to prevent displacement thereof in the case of fluid pressure failure.

According to the invention the actuator comprises a double-acting main ram or set of rams connected with the rotary element by a crank arm or its equivalent and controlled by a valve hereinafter called sequence valve, equipped with a slide valve element which also forms an actuator piston extending substantially radially in relation to the axis of the rotary element and coupled to a pair of rollers arranged at substantially diametrically opposite positions relative to a cylindrical cam rotatable with the element and having locking recesses so arranged as to be respectively aligned with one of the two rollers at the two end positions of the stroke of the rotatable element, the arrangement being such that admission of fluid pressure to one side of the auxiliary piston to initiate operation of the main ram or rams for reversal of the position of the rotary element causes the auxiliary piston to move that roller which by engagement with one of the recesses of the cam locks the rotary element in its present position, out of said recess and urge the other roller into contact with the cylindrical surface of the cam, this displacement of the auxiliary piston causing the slide valve to admit fluid pressure to one side and release fluid pressure from the other side of the main ram or rams thus causing the ram or rams to effect the desired reversal operation of the rotary element, the completion of which places the other recess into alignment with the second roller, which had been urged into contact with the cylindrical circumference, thus enabling the auxiliary piston to move to the end of its stroke and engage the second roller in said other recess to lock the rotary element in its reverse position and causing the slide-valve piston to substantially seal the exhaust side of the or each main ram from the valve port which in this condition is connected to exhaust, a manual selector valve being provided for selectively admitting fluid pressure to one side of the sequence-valve piston and venting it from the other side or vice versa, and resilient catch means being provided which tend to retain the sequence-valve piston and the manual selector valve in each end position. The blanking of that service port of the service valve which in the completed operation admitted the exhaust of the ram motor to the selector valve ensures that when the selector valve is subsequently moved to cause another reversal of the position of the rotary element, fluid will not be admitted to the main ram to effect such reversal until the sequence-valve piston has disengaged the locking roller from its notch in the cylindrical locking cam. Since, on the other hand, it is desirable to maintain pressure in the main ram cylinder to hold the rotary element in its assumed position, and since, therefore, it is undesirable to permit a pressure build-up at the opposite side of the main ram due to leakage past the sealing surfaces of the main ram, the sequence-valve piston is preferably provided with a restricted vent near the centre of its length, between two piston-rings or other piston-end seals.

The manually operated control valve is preferably constructed as a second slide valve arranged coaxially with the sequence valve proper and attached to it by a flange so that the assembly of sequence and selector valve can be supplied and mounted as a complete unit.

In many uses of the invention, and particularly in the application of the invention to jet deflectors for aircraft, for which the invention has been primarily designed although its use is not restricted thereto, it is convenient to construct the sequence and selector valve unit for attachment to one side of the jet engine or other structure and to conduct the service passage to the two sides of the ram or rams through the attachment surface, and when two jet engines or the like are employed, each equipped with an actuator according to the invention, it will be often found convenient to have the two selector valves arranged so as to face each other. In this case, in order that the same position of the respective selector valves should produce in both jet engines the same deflector position viz: either forward thrust position or hovering position, the directions of rotation of the two rotary elements produced by similar movement of their respective selector valves must be opposite to each other, so that two sequence valve units having mutually reversed inter-connections between the sequence valve and the selector valve must be provided, and it is desirable to achieve this with the use of identical parts while ensuring at the same time ready distinction between the two types of valves. For this purpose, according to a feature of the invention, the fluid-pressure passages leading from the two ends of the selector-valve bore to the two ends respectively of the sequence-valve bore are arranged to penetrate the connecting flange between the selector and sequence valve at diametrically opposite points, and the two flanges are respectively provided with an index mark and with two distinctive symbols or the like respectively co-operating with the index mark in the two mutually reversed positions of assembly. A particularly convenient form of index mark is a tab projecting from one of the flanges so as to cover one of the two alternative symbols on the other flange, leaving only the appropriate symbol visible in each case.

In the cases of a ram that is pivotally attached to the stationary frame, both service lines associated with one ram cylinder must be conducted through the pivot at one end of the cylinder. In this case, according to a subsidiary feature of the invention, connection to the other end of the cylinder is preferably effected by means of a tube arranged axially of the piston and fixed to the pivoted end of the cylinder, the tube extending through the hollow piston rod with a sliding seal, and the piston rod is surrounded by a fluid-tight sleeve cooperating with the end seal at the other end of the cylinder and having an outlet near the reverse side of the piston.

In order that the invention may be more readily understood, one embodiment will now be described in more detail with reference to the accompanying drawings, in which:

FIGURE 2 is a sectional elevation of the sequence-and-selector valve unit, and

FIGURES 3A and 3B show the sequence-and-selector valve unit respectively assembled for left-hand and right-hand mounting.

Figure 1:
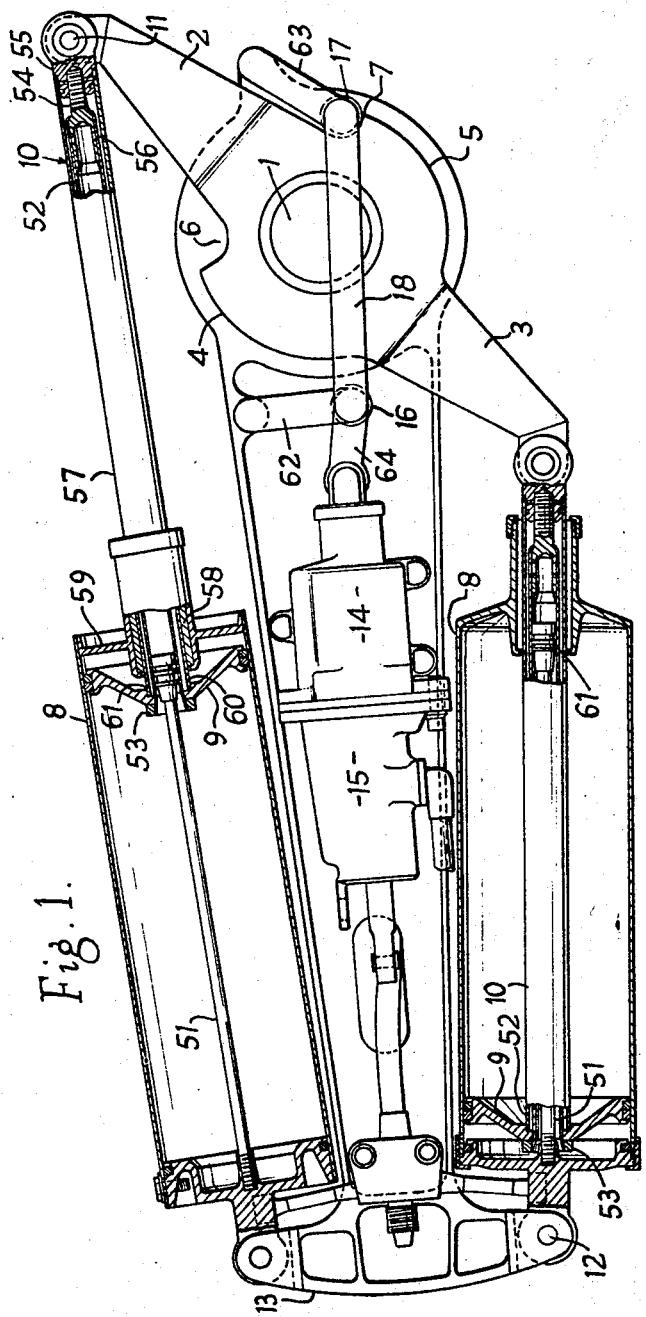
FIGURE 1 is an elevation, partly in section, of one actuator mechanism incorporating the present invention.

Referring now first to FIGURE 1, a shaft carrying the deflector or change-over valve of an aircraft jet engine is indicated at 1. It is equipped with an actuating lever having two oppositely extending arms 2 and 3 and formed with a cam portion which includes two parts 4 and 5 of a cylinder surface, each part terminating in a recess 6 or 7, the purpose of which will be described further below. Two double-acting rams each include a cylinder 8 equipped with a piston 9, and each piston 9 is connected by a piston rod 10 to a pivot 11 at the end of arm 2 or 3 of the actuating lever. Each cylinder 8 is pivoted at the end which faces away from the pivot 11, to a stationary frame member 13 by a pin 12. A valve unit, comprising a sequence valve 14 and a selector valve 15 coaxially connected to it by an end flange, serves to control admission of fluid pressure to the end adjacent to pivot 12 of one of the rams and to the opposite end of the other ram or vice versa, thus causing these rams to exert, by their piston rods 10, substantially equal opposite forces on the two pivots 11, thus jointly exerting on the shaft 1 substantially no resultant force but a resultant couple corresponding to the sum of the forces of each ram multiplied by the distance of the piston rods 10 from the axis of the shaft 1.

In order to establish connection to both ends of each ram cylinder without the use of externally arranged pipes, fluid connection to the right-hand end of each piston 9 (as seen in the drawing), is established by means of a straight pipe 51 extending from the centre of the cylinder bottom adjacent to the pivot 12 through a central aperture of the piston 9 into a tubular piston-rod member 52, the free end of the pipe 51 being sealingly guided in the tube 52 by means of a suitable packing 61. The tubular piston-rod member 52 has a head 53 bearing on the end of the piston facing the cylinder bottom while the other end of the tubular member 52 is closed by a plug member 54 having its screw-threaded end engaging an eyelet pivoted to the crank pin 11 of the lever 2. The interior of the tubular member 52 communicates through cross bores 56 near the closed end of the member, with an annular chamber formed between the member 52 and an outer tube 57 coaxially surrounding the tubular member 52. The outer tube 57 is supported at one end against a shoulder of the eyelet 55 and at its other end against the piston 9. It therefore acts as a spacing member between the two, and is forced into sealing contact with both by the tube 52 acting as a bolt. The tube 57 constitutes an outer shell of the piston rod 10 and slides sealingly in a suitable packing 58 carried by an end cap 59 closing the cylinder 8 at the end opposite to the above-mentioned bottom. Crossbores 60, closely adjacent to the piston 9, establish communication between the annular chamber confined by the tubes 52 and 57, and the end of the ram cylinder adjacent to the end cap 59. It will be seen that, throughout the stroke of the piston 9, the pipe 51 is supported at both ends, one end being fixed to the bottom of the cylinder 8, while the other end of pipe 51 is supported in the tube 52, and that the arrangement ensures permanent communication of the pipe 51, and thus of the end of a suitable connection in the pivot 12 of the cylinder 8, with the remote end of the cylinder. The sequence valve 14 is arranged in addition to its function in distributing fluid pressure to the appropriate sides of the ram cylinders 8, to serve also as an actuator for two locking rollers 16 and 17, which are coupled by a link 18 at a spacing sufficient to allow the cylindrical cam parts 4, 5 to rotate between them.

The piston rod 36 of the sequence valve may carry the roller 16 at its end, suitable guiding means being provided for the other roller 17 which is coupled to it by the connecting rod 18. In the illustrated embodiment, however, each of the rollers 16 and 17 is guided by a link 62 and 63 respectively, a further link 64 being interposed between the roller 16 and the end of the piston rod 36 of the sequence valve, thereby relieving this piston rod from transverse strain produced by a tendency of the shaft 1 to rotate against the lock provided by the roller 16.

Due to its construction, which will be described below, the sequence valve, when the selector valve 15 has been set for reversal of the position of the shaft 1, will first lift the locking roller at present in engagement from its locking recess, i.e., in the case of FIGURE 1 it will lift the roller 17 from the locking recess 7, and urge the other roller on to the cylindrical cam surface, i.e., in this example it will urge the roller 16 on to the cylindrical surface 4 which, for the time being, terminates the stroke of the sequence valve 14 in a position in which the sequence valve admits fluid pressure to the ram cylinders 8 for anti-clockwise rotation of the shaft 1. As a result the rams will effect the reversal of the position of the shaft 1 and its deflector member and, at the end of this reversal movement, roller 16 will reach the recess 6 of the surface 4 and be moved to engage it by the piston of the sequence valve 14, which thus is allowed to move from the intermediate position in which it was retained by the surface 4, to the end of its stroke, i.e., to a position in which it is ready to commence the inverse sequence of operations when the selector valve 15 is reversed again.

Referring now to FIG. 2, the selector valve 15 has a cylindrical bore 19 open to the atmosphere at 20 and provided near the centre of its length with an air-inlet port 21 for connection to a fluid-pressure supply, while two ports 22 and 23, equally spaced in opposite directions from the port 21, are connected by passages 24 and 25 respectively to the two ends of a larger-diameter cylindrical bore 27 in the sequence valve proper 14. The passages 24 and 25 pass at places arranged symmetrically to the common axis of the valves through the mutually facing surfaces of connecting flanges 28, 29 which respectively form part of the sequence valve and of the selector valve. Slidable in the bore 19 of the selector valve is a slide-valve element 30 which has two axially spaced lands constituted by carbon rings 31 and 32, and which is actuated from the pilot's cockpit by means of a linkage 33. The respective bores of the selector and sequence valves are separated by a partition 34, which is clamped between the flanges 28 and 29 and has through bores in line with the passages 24 and 25. The sequence valve 14 has a combined slide-valve-and-piston element 35. This element is movable in the bore 27 under the action of fluid pressure admitted to one or the other end of the bore by means of the selector valve 15, and is provided with a piston rod 36 passing through a carbon seal 37. Two service ports 38 and 39 of short axial length in relation to their cross-section are provided in the bore 27. They are axially spaced from each other and from the two ends of the bore so that each will find itself about half-way between the two ends of the piston 35 when the latter is at the respective end of its stroke, while both ports are clear and communicate freely with passages 24 and 25 respectively when the piston 35 is at the middle of its stroke, i.e., in the position at which its movement is temporarily terminated when one of the rollers 16, 17 strikes the cylindrical cam surface portion 4 or 5. A substantially fluid-tight seal between the circumference of the piston 35 and the bore 27 is achieved by means of two axially spaced carbon seals 40 and 41, while a groove 42 between the two seals communicates with a restricted vent constituted by radial bores leading into axial bores 43 of the piston rod 36.

In order to retain the locking roller 16 or 17 in the locking position, even in the case of fluid-pressure failure, spring catches 46 carried by the partition 34 are arranged to engage suitable notches or recesses 47 or 48 in the bore 49 of the hollow piston rod 36 at the two ends of the stroke of the latter, and similar spring catches 50, engaging suitable recesses in a similar bore of the selector slide valve 30, are preferably provided to retain the latter at each end of the stroke against accidental displacement.

In order to provide right-hand and left-hand versions of the valve, the relationship between the position of the selector valve piston 30 and the end of the bore 27 to which fluid pressure is admitted, is made reversible by so arranging the flanges 28 and 29 that they can be interconnected in two positions displaced by 180° about the common axis of the two valves. In order to identify the right-hand and left-hand versions of the assembly, markings such as the letters R.H. and L.H., respectively identifying the right-hand and left-hand versions, are arranged on diametrically opposite points of the flange 29. The selector valve 15 is intended to be carried by the sequence valve 14 and the latter to be secured to the engine housing or the like by means of lugs shown at 44, and the flange 28 has a tag 45 (see FIGURES 3A and 3B) which in each of the two assembly positions shrouds the inapplicable symbol.

Preferably two sets of rams 8, 9, 10, are provided for each jet deflector, one at each side of the engine, one of the sets of rams being constructed as hereinabove described, while the other is a slave unit connected to the sequence valve unit of the first-mentioned set in parallel with that set.

What we claim is:

1. A fluid-pressure operated self-locking actuator for the alternating rotary-movement of an element between two end positions, comprising a generally cylindrical cam having means for connection with such element for common rotary movement and having a first and a second recess spaced from each other along the circumference of the cam, a first and a second detent member for respective co-operation with said first and second recesses, said detents being arranged in opposition along a line approximately diametric of said cam and being mechanically interconnected for joint movement approximately along said line with a mutual spacing at least equal to the diameter of said cam, a main ram device, a selector valve, a sequence valve controlling the admission of fluid to said main ram device and having a valve piston which is movable along a valve cylinder and urged in a selected one of two opposite directions by pressure fluid under the control of said selector valve, the valve piston being mechanically coupled to said detent members so as to raise, at the beginning of its movement from one to the other end of the valve cylinder, one of said detent members from its associated recess in said cam to a point at which the other detent member becomes supported on the cylindrical circumference of the cam to halt the movement of the sequence valve in an intermediate position, said valve having near such other end of the sequence valve cylinder, a port, which when the sequence valve is in said intermediate position, admits pressure fluid from the selector valve to one side of the main ram device to produce movement thereof to move the element from one to the other of its end positions, said other recess being so arranged relative to said one recess as to face its associated detent member when the element is in said other position, thereby allowing the sequence valve to complete its stroke and thereby close the said port.

2. An actuator as claimed in claim 1, wherein the valve piston is provided with a restricted vent near the centre of its length, and with two piston-end seals, one at each side of said vent.

3. An actuator for the rotary movement of an element between two end positions, which comprises a double-acting main ram device and means for operative connection of said ram device with such element, a sequence valve controlling said ram device and including a slide-valve piston movable in a valve cylinder that extends substantially radially in relation to the axis of rotation of the element, a cylindrical cam which is rotatable with such element and has locking recesses, a pair of rollers coupled to said valve piston at approximately diametrically opposite positions relative to said cylindrical cam, said recesses being so arranged in the circumference of said cam as to be respectively in the line of movement of one and the other of the two rollers at each of the two end positions of the rotary movement of the element, the valve cylinder having ports so arranged that admission of pressure fluid to one side of the valve piston to initiate operation of the ram device for moving the element from one end position to the other, causes the valve piston to move that roller which, by engagement with one of the recesses of the cam has been locking the element in one position, out of said recess to a point at which movement of the valve piston is halted by contact of the other roller with the cylindrical surface of the cam, and the slide valve being so constructed that this displacement of the valve piston causes the slide valve to admit pressure fluid to one side, and release fluid from the other side, of the ram device, thus causing the ram device to effect reversed movement of the element, the other recess being so arranged on the circumference of the cam that at the completion of this movement said other recess faces the line of movement of said other roller, thus enabling the valve piston to complete its stroke and thereby engage the said other roller in said other recess for locking the element in its reversed position and isolating that side of the ram device which during the reversing operation was connected to exhaust, the actuator further comprising a manual selector valve having one position in which it admits pressure fluid to one side of the valve piston and vents it from the other side, and another position on which it conversely admits pressure fluid to said other side of the valve piston and vents it from said one side, and resilient indexing means which tend to retain the manual selector valve in each of said positions.

4. An actuator as claimed in claim 3, wherein the selector valve is constructed as a further slide valve arranged co-axially with the sequence valve and attached to it by a flange so that the assembly of sequence and selector valve constitutes a single structural unit.

5. An actuator as claimed in claim 3, including a frame and a ram that has one end pivotally attached to the frame, the actuator having two service lines respectively connecting the two ends of the ram cylinder to ports on the sequence valve, said lines extending through the pivotal connection at said end of the cylinder, and one of them including a tube arranged axially of the piston and fixed to the said end of the cylinder to effect connection to the other end of the cylinder, the ram having a hollow piston rod, through which the tube extends with a sliding seal, and a fluid-tight sleeve surrounding the piston rod and co-operating with an end seal at the other end of the cylinder, said sleeve having an outlet near the side of the piston remote from the pivoted end of the cylinder.

6. An actuator as claimed in claim 1, including an output shaft having two oppositely extending crank arms, two double-acting rams, each mechanically connected to one of said two crank arms, wherein said sequence valve controls the supply of pressure fluid to both rams.

References Cited

UNITED STATES PATENTS

| | | | |
|---|---|---|---|
| 731,664 | 6/1903 | Clark | 92—28 |
| 1,403,569 | 1/1922 | Rogers | 92—17 |
| 2,029,634 | 2/1936 | Peter | 92—28 |
| 2,130,618 | 9/1938 | Gnavi | 91—45 |
| 2,144,892 | 1/1939 | Parker | 92—25 |
| 2,515,287 | 7/1950 | Audemar | 92—25 |
| 2,597,418 | 5/1952 | Westbury et al. | 91—45 |
| 2,623,502 | 12/1952 | Lisle | 91—45 |
| 3,217,609 | 11/1965 | Royster | 92—25 |

MARTIN P. SCHWADRON, *Primary Examiner.*

HENRY T. KLINKSIEK, EVERETT W. KIRBY,
*Examiners.*

B. L. ADAMS, *Assistant Examiner.*